(12) United States Patent
Liu et al.

(10) Patent No.: US 7,953,685 B2
(45) Date of Patent: May 31, 2011

(54) FREQUENT PATTERN ARRAY

(75) Inventors: Li Liu, Beijing (CN); Qiang Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 11/965,379

(22) Filed: Dec. 27, 2007

(65) Prior Publication Data
US 2009/0171954 A1 Jul. 2, 2009

(51) Int. Cl.
*G06F 17/00* (2006.01)
*G06N 5/00* (2006.01)

(52) U.S. Cl. ........................................................ 706/45
(58) Field of Classification Search ................... 706/45
See application file for complete search history.

(56) References Cited

U.S. PATENT DOCUMENTS

| | | | | |
|---|---|---|---|---|
| 6,665,669 B2 * | 12/2003 | Han et al. | ............................... | 1/1 |
| 6,941,303 B2 * | 9/2005 | Perrizo | ............................... | 1/1 |
| 7,433,879 B1 * | 10/2008 | Sharma et al. | ........................ | 1/1 |
| 7,480,640 B1 * | 1/2009 | Elad et al. | ........................ | 706/14 |
| 7,493,330 B2 * | 2/2009 | Cubranic | ............................... | 1/1 |
| 7,509,677 B2 * | 3/2009 | Saurabh et al. | ................. | 726/23 |
| 7,698,170 B1 * | 4/2010 | Darr et al. | ................... | 705/26.35 |

OTHER PUBLICATIONS

"Optimization of Frequent Itemset Mining on Multi-Core Processor" Li Liu, Eric Li, Yimin Zhang, Zhizhong Tang, Sep. 23-28, 2007, VLDB '07: Proceedings Of the 33rd international conference on Very Large Databases.*
A comparison of two suffix tree-based document clustering algorithms, Rafi, M.; Maujood, M.; Fazal, M.M.; Ali, S.M.; Information and Emerging Technologies (ICIET), 2010 International Conference on Digital Object Identifier: 10.1109/ICIET.2010.5625688 Publication Year: 2010 , pp. 1-5.*
Discovery of Collocation Patterns: from Visual Words to Visual Phrases, Junsong Yuan; Ying Wu; Ming Yang; Computer Vision and Pattern Recognition, 2007. CVPR '07. IEEE Conference on Digital Object Identifier: 10.1109/CVPR.2007.383222 Publication Year: 2007 , pp. 1-8.*
Automatic Pattern-Taxonomy Extraction for Web Mining, Sheng-Tang Wu; Yuefeng Li; Yue Xu; Binh Pham; Phoebe Chen; Web Intelligence, 2004. WI 2004. Proceedings. IEEE/WIC/ACM International Conference on Digital Object Identifier: 10.1109/WI.2004.10132 Publication Year: 2004, pp. 242-248.*
Mining Frequent Trajectory Patterns for Activity Monitoring Using Radio Frequency Tag Arrays, Liu, Yunhao; Chen, Lei; Pei, Jian; Chen, Qiuxia; Zhao, Yiyang; Pervasive Computing and Communications, 2007. PerCom '07. Fifth Annual IEEE International Conference on Digital Object Identifier: 10.1109/PERCOM.2007.23 Pub Year: 2007 , pp. 37-46.*
S. Shporer, "AIM2: Improved Implementation of AIM", Proceedings of ICDM Workshop on Frequent Itemset Mining Implementations, 2004, 2 pages.

(Continued)

*Primary Examiner* — Michael Holmes
(74) *Attorney, Agent, or Firm* — Trop, Pruner & Hu, P.C.

(57) ABSTRACT

Machine readable media, methods, and computing devices are disclosed that mine a dataset using a frequent pattern array. One method of includes building a frequent pattern tree comprising a plurality of nodes to represent frequent transactions of a dataset that comprises one or more items. The method also includes transforming the frequent pattern tree to a frequent pattern array that comprises an item array and a plurality of node arrays, the item array comprising frequent transactions of the dataset and each node array to associate an item of the dataset with one or more frequent transactions of the item array. The method further includes identifying frequent transactions of the dataset based upon the frequent pattern array.

20 Claims, 3 Drawing Sheets

OTHER PUBLICATIONS

J. Park, M. Chen, and P. Yu, "An Effective Hash-Based Algorithm for Mining Association Rules", Proceedings of the International Conference on Management of Data, 1995, 175-186, 12 pages.

A. Savasere, E. Omiecinski, and S. Navathe, "An Efficient Algorithm for Mining Association Rules in Large Database", Proceedings of the International Conference on Very Large Data Bases, 1995, 1-24, 24 pages.

C. Lucchese, S. Orlando, P. Palmerini, R. Perego, F. Silvestri, "kDCI: a Multi-Strategy Algorithm for Mining Frequent Sets", Proceedings of ICDM Workshop on Frequent Itemset Mining Implementations, 2003, 10 pages.

S. Brin, R. Motwani, and C. Silverstein, "Beyond Market Basket: Generalizing Association Rules to Correlations", Proceedings of the International Conference on Management of Data, 1997, 12 pages.

A. Ghoting, G. Buehrer, S. Parthasarathy, D. Kim, A. Nguyen, Y. Chen, and P. Dubey, "Cache-Conscious Frequent Pattern Mining on a Modern Processor", Proceedings of the International Conference on Very Large Data Bases, 2005, 577-588, 12 pages.

H. Mannila, H. Toivonen, and A.I. Verkamo, "Discovery of Frequent Episodes in Event Sequences", Data Mining and Knowledge Discovery, 1, 3, Sep. 1997, 259-289, 31 pages.

G. Dong and J. Li, "Efficient Mining of Emerging Patterns: Discovering Trends and Differences", Proceedings of the International Conference on Knowledge Discovery and Data Mining, 1999, 43-52, 10 pages.

J. Han, G. Dong, and Y. Yin, "Efficient Mining of Partial Periodic Patterns in Time Series Dataset", Proceedings of the International Conference on Data Engineering, 1999, 1-10, 10 pages.

K. Gouda and M. Zaki, "Efficiently Mining Maximal Frequent Itemsets", Proceedings of the International Conference on Data Mining, 2001, 163-170, 8 pages.

G. Grahne, J. Zhu, "Efficiently Using Prefix-Trees in Mining Frequent Itemsets", Proceedings of ICDM Workshop on Frequent Itemset Mining Implementations, 2003, 10 pages.

R. Agrawal and R. Srikant, "Fast Algorithms for Mining Association Rules", Proceedings of the International Conference on Very Large Data Bases, 1994, 487-499, 13 pages.

O. R. Zaiane, M. El-Hajj, and P. Lu, "Fast Parallel Association Rule Mining Without Candidacy Generation", Proceedings of the International Conference on Data Mining, 2001, 665-668, 4 pages.

J. Zhou, J. Cieslewicz, K. Ross, M. Shah, Improving Dataset Performance on Simultaneous Multithreading Processors, "Proceedings of the International Conference on Very Large Data Bases", 2005, 49-60, 12 pages.

T. Uno, M. Kiyomi, H. Arimura, "LCM ver. 2: Efficient Mining Algorithms for Frequent/Closed/Maximal Itemsets", Proceedings of ICDM Workshop on Frequent Itemset Mining Implementations, 2004, 1-11, 11 pages.

D. Burdick, M. Calimlim, and J. Gehrke, "Mafia: A Maximal Frequent Itemset Mining Algorithm for Transactional Databases", Proceedings of the International Conference on Data Engineering, 2001, 10 pages.

R. Agrawal, T. Imielinski, and A. Swami, "Mining Association Rules Between Sets of Items in Large Database", Proceedings of the International Conference on Management of Data, 1993, 207-216, 10 pages.

J. Han, J. Pei, and Y. Yin, "Mining Frequent Patterns Without Candidate Generations", Proceedings of the International Conference on Management of Data, 2000, 1-12, 12 pages.

R. Agrawal and R. Srikant, "Mining Sequential Patterns", Proceedings of the International Conference on Data Engineering, 1995, 12 pages.

M. Zaki, S. S Parthasarathy, M. Ogihara, and W. Li, "New Algorithms for fast Discovery of Association Rules", Proceedings of the International Conference on Knowledge Discovery and Data Mining, 1997, 24 pages.

B. Racz, "nonordfp: An FP-growth variation without rebuilding the FP-tree", Proceedings of ICDM Workshop on Frequent Itemset Mining Implementations, 2004, 6 pages.

Silverstein, S. Brin, R. Motwani, and J. Ullman, "Scalable Techniques of Mining Causal Structures", Proceedings of the International Conference on Very Large Data Bases, 1998, 594-605, 12 pages.

R. Jin, G. Yang, and G. Agrawal, "Shared Memory Parallelization of Data Mining Algorithms: Techniques, Programming Interface, and Performance", IEEE Trans. Knowl. Data Eng. 17,1, Jan. 2005, 71-89, 19 pages.

D. Callahan, K. Kennedy, A. Porterfield, "Software Prefetching", Proceedings of International Conference on Architectural Support for Programming Languages and Operating Systems, 1991, 40-52, 13 pages.

John W. C. Fu, Janak H. Patel, Bob L. Janssens, "Stride Directed Prefetching in Scalar Processors", Proceedings of International Symposium on Microarchitecture, 1992, 102-110, 9 pages.

DH. Chen, CR. Lai, W Hu, WG. Chen, YM. Zhang, WM. Zheng, "Tree Partition Based Parallel Frequent Pattern Mining on Shared Memory Systems", Proceedings of IPDPS Workshop on Parallel and Distributed Scientific and Engineering, 2006, 8 pages.

I. Pramudiono and M. Kitsuregawa, "Tree Structure Based Parallel Frequent Pattern Mining on PC Cluster", Proceedings of the International Conference on Database and Expert System Applications, 2003, 537-547, 11 pages.

S. Orlando, P. Palmerini, R. Perego, and F. Silvestri, "An Efficient Parallel and Distributed Algorithm for Counting Frequent Sets", VECPAR, 2002, 14 pages.

\* cited by examiner

FREQUENT PATTERN ARRAY

BACKGROUND

Frequent Itemsets Mining (FIM) is the basis of Association Rule Mining (ARM), and has been widely applied in marketing data analysis, protein sequences, web logs, text, music, stock market, etc. Many FIMI (FIM Implementation) algorithms have been proposed in the literature. The frequent pattern tree (FP-tree) algorithm is one of the fastest and most widely used FIMI algorithms. The FP-tree algorithm has two phases. In the FP-tree build phase, the FP-tree algorithm builds a FP-tree from a transaction database, removing all the infrequent items. In the FP-growth phase, the FP-tree algorithm grows the FP-tree by iterating through each item in the FP-tree. In particular, the FP-tree algorithm finds all the frequent items in a conditional pattern base for an item, and then builds a new FP-tree for this conditional pattern base when the conditional pattern base has at least two frequent items. Thus, the conditional pattern base is scanned twice in each iteration. In general, an FP-tree node is accessed many times since the condition pattern bases of all items share the same FP-tree.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
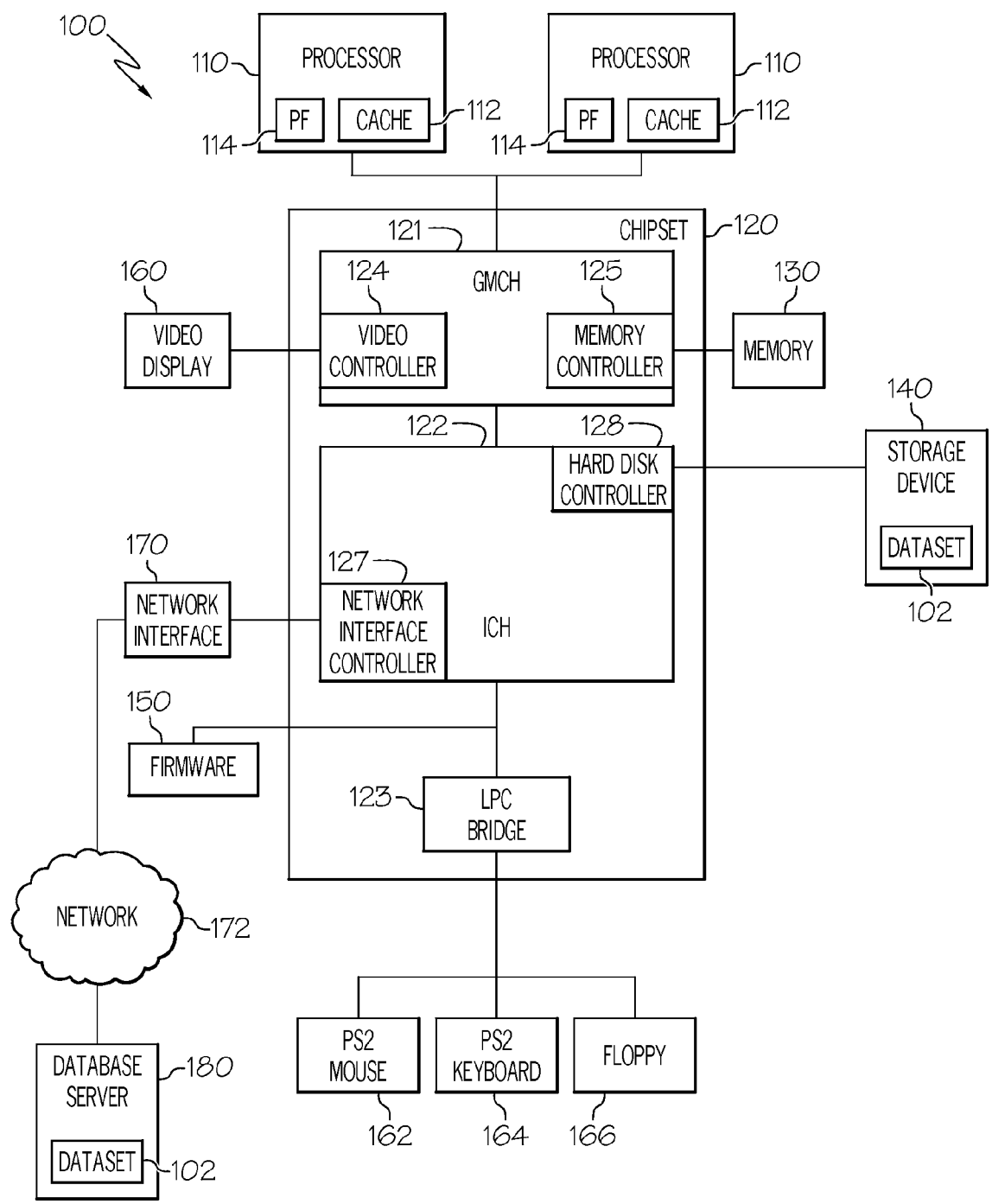
FIG. 1 shows an embodiment of a computing device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, an embodiment of a computing device 100 to mine a dataset 102 is shown. The computing device 100 may be embodied in various forms such as, for example, a desktop computer system, laptop computer system, a server computer system, a cluster of computer systems, or mainframe. The computing device 100 may include one or more processors 110, a chipset 120, system memory 130, a storage device 140, and platform firmware device 150. It should be noted that while the computing device 100 is depicted in FIG. 1 with two processors 110, other embodiments of the computing device 100 may have a single processor 110 or more than two processors 110. The processors 110 may perform tasks in response to executing software instructions of the storage device 140 and/or firmware instructions of the platform firmware device 150. Furthermore, the processors 110 may include caches 112 that provide the processors 110 with storage that may be accessed more quickly than the memory 130. Thus, by maintaining copies of frequently accessed instructions and data in the caches 112, the computing device 100 may operate more efficiently as the processors 110 spend less time waiting for data and/or instructions to be read from and/or to be written to the memory 130.

The processors 110 may also include a hardware prefetcher 114. The prefetcher 114 may monitor memory accesses of the processor 110 in an attempt to infer prefetching opportunities, may record memory access patterns of the executing application, and may prefetch data addresses on a best effort basis. Many processors such as, for example, the Intel® Pentium® 4 processor have a hardware prefetcher that operates without user intervention. Simple patterns such as sequential and stride memory accesses are easily recognized by the hardware prefetcher 114. The prefetcher 114 may place frequently used data and/or instructions in the cache 112 thus further increasing cache efficiency of the computing device 100.

As shown, the chipset 120 may include a graphical memory controller hub (GMCH) 121, an input/output controller hub (ICH) 122, and low pin count (LPC) bus bridge 123. The LPC bus bridge may connect a mouse 162, keyboard 164, floppy disk drive 166, and other low bandwidth devices to an LPC bus used to couple the platform firmware device 150 to the ICH. The graphical memory controller hub 121 may include a video controller 124 to control a video display 160 and a memory controller 125 to control reading from and writing to system memory 130. The system memory 130 may store instructions to be executed by the processors 110 and/or data to be processed by the processors 110. To this end, the system memory 130 may include dynamic random access memory devices (DRAM), synchronous DRAM (SDRAM), double-data rate (DDR) SDRAM, and/or other volatile memory devices.

As shown, the ICH 122 may include a network interface controller 127 to control a network interface 170 such as, for example, an Ethernet interface, and a hard disk controller 128 to control a storage device 140 such as an ATA (Advanced Technology Attachment) hard disk drive. In one embodiment, the computing device 100 may access a dataset 102 that includes many transactions and may mine the dataset 102 for transactions having co-occurring frequent items. To this end, the dataset 102 or a portion of the dataset 102 may be stored in a database of the storage device 140. In another embodiment, a networked database server 180 may store the dataset 102 and the computing device 100 may access the dataset 102 via a network 172 the couples the computing device 100 to the networked database server 180.

Figure 2:
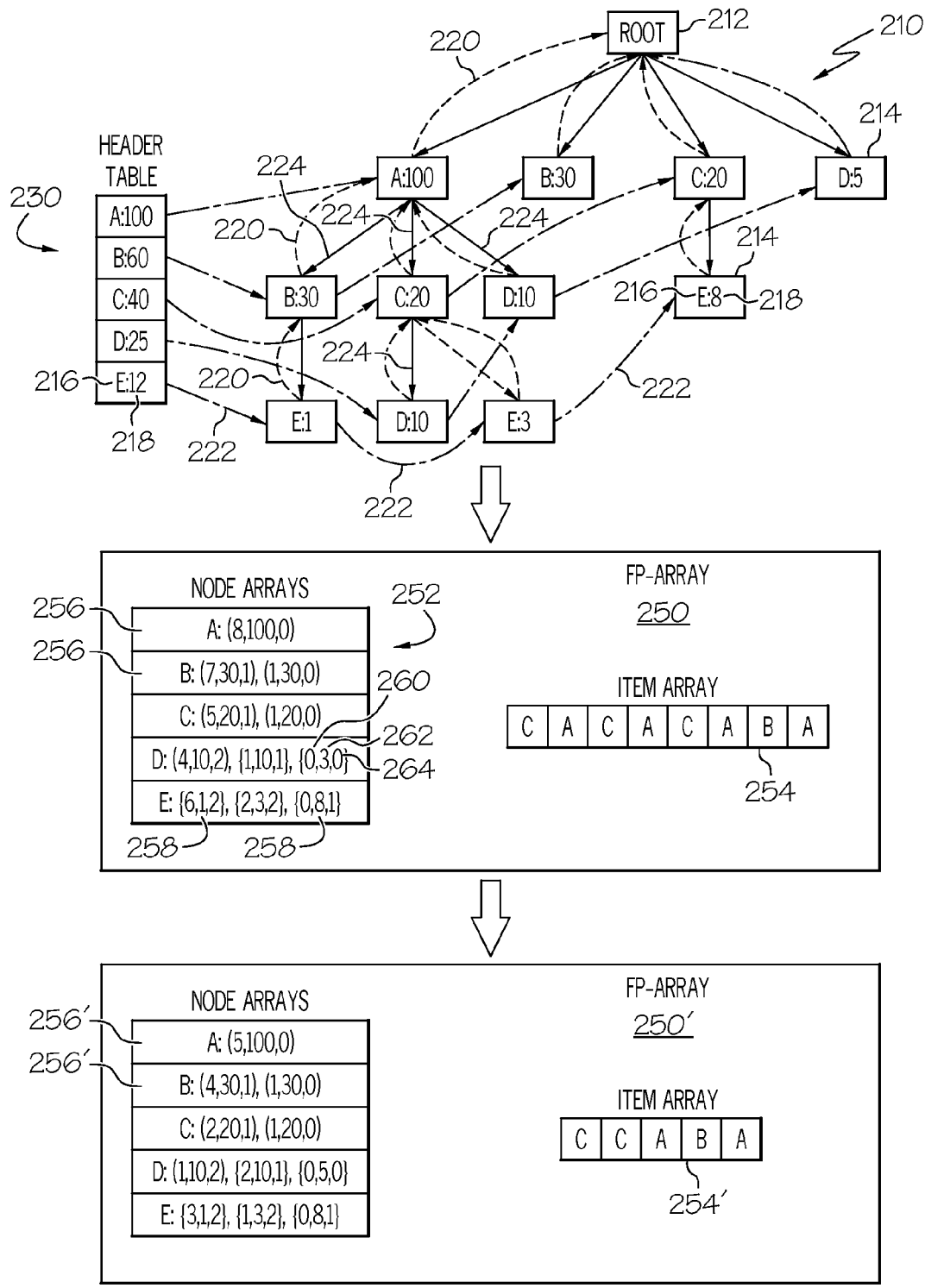
FIG. 2 shows an embodiment of an FP-tree and an FP-array generated by the computing device of FIG. 1.
Figure 3:
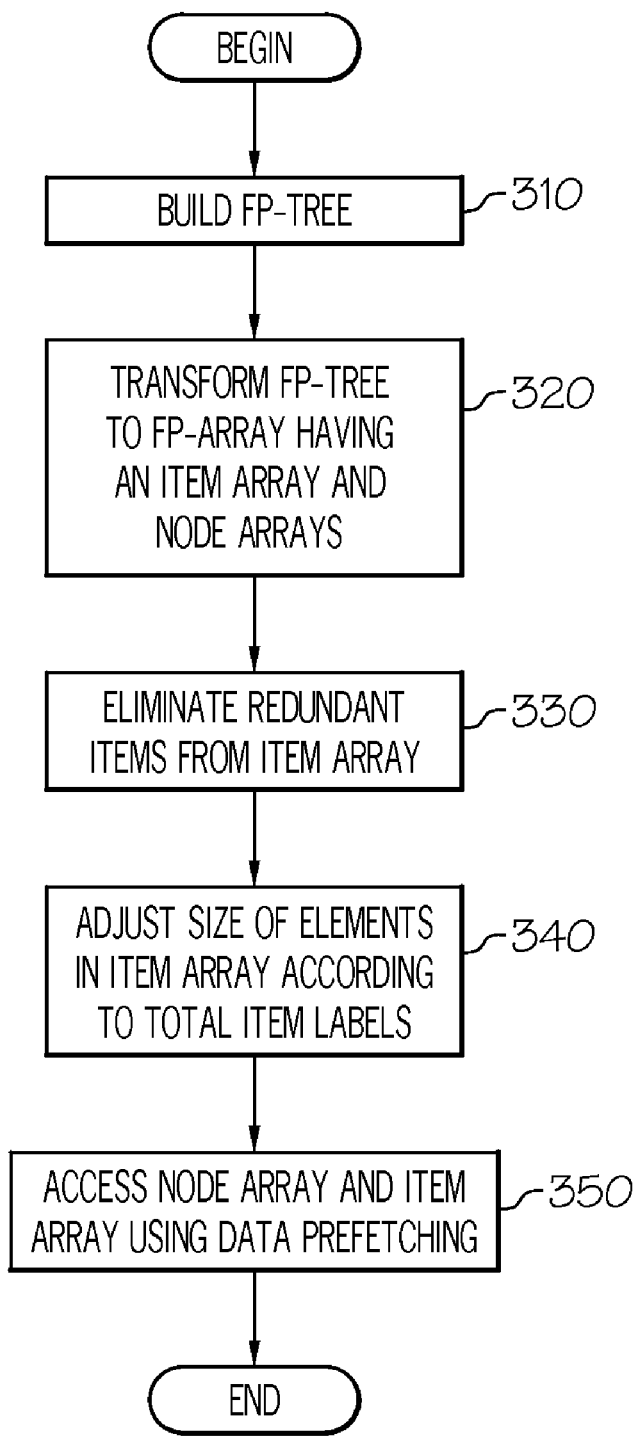
FIG. 3 shows an embodiment of a process used by the computing devise to mine a data set using an FP-array.

An embodiment of a data mining process 300 that may be used by the computing device 100 to mine the dataset 102 is explained in reference to FIGS. 2 and 3. FIG. 2 shows various data structures generated and manipulated by the computing device 100 during an embodiment of the data mining process 200. FIG. 3 shows a high level flowchart of an embodiment of the data mining process 300. As shown in FIG. 3, during a build phase, the computing device 100 at 310 may build a frequent pattern tree (FP-tree) 210 from transactions of the dataset 102. After the build phase, the computing device 100 may transform the FP-tree to an FP-array and grow the FP-array during a growth phase to mine co-occurring patterns from the dataset 102. In particular, the computing device 100 at 320 may transform the FP-tree 210 to a frequent pattern array (FP-array) 250 that includes an item array 254, and a list 252 of node arrays 256. The computing device 100 at block 330 may eliminate redundant items from the item array 254 and may update the node arrays 256 accordingly. At 340, the computing device 100 may adjust the element size of the item array 254 based upon the total number of item labels in order to conserve memory space and further increase cache efficiency. Finally, at 350, the computing device 100 may access the item array 254 and the node arrays 256 of the FP-array 250 using various prefetching techniques during mining of frequent patterns from the dataset 102. Each of the operations shown in FIG. 3 are discussed in further detail below.

As mentioned above, the computing device 100 during the FP-tree build phase of the data mining process 300 may build an FP-tree 210. In particular, the computing device 100 may generate an FP-tree 210 which is a compact representation of the transaction dataset 102. Each FP node 214 of the tree 210 stores an item label 216 and a count 218. The count 218 represents the number of transactions of the dataset 102 that contain all the items in the path from the root node 212 to the current FP node 214. The computing device 100 may construct the FP-tree 210 based on the following observations:

For a dataset, only frequent 1-items are necessary to be kept, while other items may be pruned away.

If multiple transactions share an identical frequent item set, they may be merged into one with the number of occurrences registered as count.

If two transactions share a common prefix, according to some sorted order of frequent items, the shared parts may be merged using one prefix structure as long as the count is registered properly.

With these observations, the computing device 100 may construct the FP-tree 210 as follows. First, the computing device 100 may scan the dataset 102 to count the frequency of 1-items. For each transaction, the computing device 100 may insert the frequent items of the transaction into the FP-tree 310 in frequency descending order. The computing device 100 may generate a new FP node 214 in response to determining that the FP-tree a node 214 with the appropriate item label 216 is not found; otherwise, the computing device 100 may increase the count of the existing nodes.

Since the FP-tree 210 is the projected dataset of a frequent k-itemset, the union of the k-itemset and any item in the FP-tree 210 is a frequent (k+1)-itemset. Specifying $\alpha$ is an item in this FP-tree, the projected FP-tree for $\alpha$ is constructed from the conditional pattern base of $\alpha$. Each transaction in the transaction pattern base is an item sequence in the bottom-up path starting from the node associated with item $\alpha$ in the FP-tree 210. Each FP node 214 in the FP-tree 210 may include five members: item label 216, count 218, parent pointer 220, nodelink pointer 222 and child pointers 224. The nodelink pointer 222 points to the next item in the FP-tree 210 with the same item label 216, and child pointers 224 record a list of pointers to all children of the FP node 214. A header table 230 is used to store pointers 222 to the first occurrence of each item in the FP-tree 210. A path in the FP-tree 210 represents a set of transactions that contain a particular frequent item pattern. For example, in FIG. 2, the path "root→C→E" represents all the transactions that contain item "C" and "E".

Pseudo-code describing the process of building the FP-tree 210 is provided in LISTING 1 below. In particular, LISTING 1 includes a min-support parameter minsupp which defines a minimum frequency for an item in the dataset 102 to be retained by the FP-tree 210:

---

LISTING 1

Algorithm: FPTree Build
Input: A prefix tree D, min-support minsupp
Output: Set of all frequent patterns
(1) Scan the transaction database D once, gathering frequency of all items.
(2) Sort the items based on their frequency in descending order.
(3) Create a root node, labeled null.
(4) Scan the database a second time: for each transaction, remove items with frequency < minsupp, sort this transaction, and append the sorted transaction to the root of the tree. Each inserted node is linked to a header list of the frequent one item with that label.

---

After building the FP-tree 210, the computing device 100 at block 320 may transform the FP-tree 210 to a cache-conscious FP-array 250. The FP-array 250 is a data reorganization of the FP-tree 210 into an item array 254 and node arrays 256 which are allocated in contiguous memory space. Furthermore, the FP-array 250 of one embodiment includes no pointers and thus, the pointer based tree data structure of the FP-tree 210 is eliminated after the transformation. Given the FP-tree, the computing device 100 first allocates the item array 254 and a node array 256 in main memory 130. The computing device 100 may then traverse the FP-tree 210 in depth-first order, and copy the item for each FP node 214 to the item array 254 sequentially. The item array 254 provides a replication of the FP-tree 210. When encountering a joint node, the computing device 100 replicates the joint path in the item array 254. The node array list 252 records the occurrences of the frequent items in the item array 254. Each node array 256 of list 252 is associated with one frequent item, and each node array element 258 in the node array 256 corresponds to a FP node 214. In particular, each node array element 258 includes three members: a begin position 260 of the item in the item array 254, a reference count 262, and a transaction size 264. Therefore, the count 218, nodelink pointer 222, parent pointer 220, and child pointers 224 in the FP node 214 are converted and stored back into the node array 252.

FIG. 2 shows the FP-array 250 resulting from the computing device 100 transforming the FP-tree 210 at 320. Pseudo code describing the transformation process is shown in LISTING 2. Furthermore, TABLE 1 shows values of the relevant parameters during the transformation of the FP-tree 210 per the pseudo-code of LISTING 2. In LISTING 2, for child nodes 214 that share the same father node 214, the first child node is referred to as the head node, and the rest of the child nodes are referred to as neighbor nodes. The illustrative transformation process results in the computing device 100 storing the item array 254 in reverse order to facilitate in-order item visiting during the data mining process. Furthermore, the transformation process causes the computing device to use an item stack S to record the node path from the current node 214 to the root node 212. Unless a neighbor node is detected, the computing device 100 copies the items in stack S back to item array 254. Further, when a node 214 is visited, the computing device 100 allocates a new node array 256 corresponding to this item and decreases the head position H of item array 254 by 1. The computing device 100 writes this item back to both item array 254 and item stack S. If the current node is a leaf node, the computing device 100 increases the head position H by 1 since it is not necessary to record it in the item array 254.

---

LISTING 2

Algorithm: FPTree Transformation
Input: total item number S, number of elements in each node array
Global: Item array I, head of item array H, node array AS
Output: None
(1) Allocate sequential memory space for item array I, according to total item number S + 1.
(2) I=I+1.
(3) H=S.
(4) Allocate sequential memory for each node array AS.
(5) Visit(Root, −1).
Algorithm: Visit
Input: FP-tree node N, depth D
Global: Item array I, position of item array H, node array A, item stack S
Output: None
(1) If N is a neighbor node
    For K = 0 to D−1, step 1
        I[−−H]=S[k]
(2) Allocate an element U from A, U->begin=H, U->count=N->count, U->length=D.

---

-continued

LISTING 2

(3) I[−−H]=N->itemname.
(4) S[D]=N->itemname
(5) If N has child, For each child C of N, Visit(C, D+1).
(6) Else H++

TABLE 1

| step | Node visited | H before Visit | D | Neighbor node detected? (Y/N) | S before Visit | New element in node array | I after Visit |
|---|---|---|---|---|---|---|---|
| 1 | A | 8 | 0 | N | { } | {8, 100, 0} | -------A |
| 2 | B | 7 | 1 | N | {A} | {7, 30, 1} | ------BA |
| 3 | E | 6 | 2 | N | {AB} | {6, 1, 2} | -----EBA |
| 4 | C | 6 | 1 | Y | {A} | {5, 20, 1} | ----CABA |
| 5 | D | 4 | 2 | N | {AC} | {4, 10, 2} | ---DCABA |
| 6 | E | 4 | 2 | Y | {AC} | {2, 3, 2} | -ECACABA |
| 7 | D | 2 | 1 | Y | {A} | {1, 10, 1} | -ACACABA |
| 8 | B | 1 | 0 | N | { } | {1, 30, 0} | BACACABA |
| 9 | C | 1 | 0 | N | { } | {1, 20, 0} | CACACABA |
| 10 | E | 0 | 1 | N | {C} | {0, 8, 1} | CACACABA |
| 11 | D | 0 | 0 | N | { } | {0, 5, 0} | CACACABA |

The transformation process of LISTING 2 results in some redundancy in the item array 254. For example, mining D and E may share the same bottom-up path C→A, likewise, mining B, C and D may share the same bottom-up path A. Accordingly, the computing device at block 330 may eliminate redundant items form the item array 254 and may update the node arrays 256 accordingly. Redundant item elimination may decrease the memory consumption of item array 254 and may increase cache efficiency as a larger percentage of the item array 254 may remain in the cache 112 of the processor 112. FIG. 2 shows the condensed item array 254' and associated node arrays 256' of the condensed FP-array 250'.

To further optimize the data structure of the FP-array 250', the computing device at 340 may adjust the size of the storage elements of the item array 254 according to the total item labels 216 in use. Since each storage element in the item array 254 corresponds to the item label 216 of a FP-tree node 214, it is not necessary to use a 4-byte storage element all the time in the mining process. For example, a 1-byte size storage element is sufficient when the number of total item labels 216 is smaller than 256, similarly, a 2-byte storage element is enough when the size is smaller than 65536. Narrower data size often leads to better data locality, smaller memory consumption and good scalability performance. In the process of mining, the computing device 100 may mine the dataset 102 in item index descending order, where the items with bigger index are mined earlier. After several iterations of mining, the computing device 100 eliminates the items with bigger indices from the item array 254. For example, assume the item size is 300 in the beginning, after mining 44 items whose index is bigger than 255, the item array only has 256 items, at this time the computing device 100 may transform the item array 254 into 1-byte element sized array. LISTING 3 shows an embodiment of a process used by the computing device 100 to transform a 2-byte element into 1-byte element. In particular, the process results in the computing device 100 using in-place replacement to avoid the additional cost of memory allocation for the target item array 254.

LISTING 3

Algorithm: ItemArrayElementSizeTransformation
Input: Address of item array A, number of element in item array S
Output: None
(1)  2-byte pointer P2=A.
(2)  1-byte pointer P1=A.
(3)  For k from 0 to S−1, step = 1
        P1[k]=P2[k].

LISTING 4

Algorithm: AccessItemNodeArray
Input: Node arrays A, N: number of elements in A
Global: Item array I
Output: None
(1) For k = 0 to N−1, step 1
(2)    Prefetch(A[k+2]->begin);         // software prefetching
(3)    Node=A[k];
(4)    Begin=Node->begin;
(5)    Count=Node->count;
(6)    Length=Node->length;
(7)    For j = 0 to Length−1, step 1
(8)          Access I[j+Begin];         // hardware prefetching Although large cache hierarchies have proven to be effective in reducing the latency for the most frequently used data, it is still common for memory intensive programs to spend a lot more run time stalled on memory requests. Data prefetching may hide the access latency of data referencing patterns that defeat caching strategies. Rather than waiting for a cache miss to initiate a memory fetch, data prefetching anticipates such misses and issues a fetch to the memory system in advance of the actual memory reference. Data prefetching may significantly improve overall program execution time by overlapping computation with memory accesses. Frequent pattern mining is a memory intensive application, which does not have a significant amount of computation when accessing each node 214.

To alleviate this problem, the computing device 100 at block 350 may use prefetching when accessing the FP-array 250' during the mining process. There are two data prefetching mechanisms, i.e. hardware and software prefetching. Software prefetching initiates a data prefetch instruction issued by the processor 110, which specifies the address of a data word to be brought into the cache. When the fetch instruction is executed, this address is simply passed on to the memory system without forcing the processor 110 to wait for a response. In contrast, hardware prefetching employs special hardware. Prefetching hardware monitors the processor 110 in an attempt to infer prefetching opportunities, records memory access patterns of the executing application and prefetches data addresses on a best effort basis. Many processors 110 such as, for example, the Intel® Pentium® 4 processor have a hardware prefetcher that operates without user intervention. Simple patterns such as sequential and stride memory accesses are easily recognized.

An embodiment of accessing the FP-array 250 that may be used by the computing device 100 is shown in LISTING 4. The inner loop (the 7th line) accesses the items in a transaction, and the outer loop (the 1st line) locates the transactions associated with the same item. Since item array 254 is allocated contiguously in sequential memory space, traversing the item array 254 and node array 256 yields better data locality performance. In LISTING 4, a transaction in the frequent pattern base in the inner loop is accessed sequentially, which is preferable for hardware prefetching to capture the sequential data access pattern and improve its cache performance. Furthermore, since different transactions belonging to the same frequent item are not located in the adjacent position in the item array 254, the computing device 100 may use software prefetching to fetch the next adjacent transaction based on its lookup index in the node array 256, as shown in the 2nd line of LISTING 4.

Besides the FP-array data structure optimization, the computing device 100 may also consider efficient memory management to support large datasets 102. In the FP-tree building phase, the computing device 100 may partition the dataset 102 into several chucks, and the computing device 100 may release the memory for each particular chuck after transformation into the final FP-tree. Similarly, in the mining stage, the node array can also be released when the corresponding item finishes mining.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method, comprising:
   building a frequent pattern tree comprising a plurality of nodes to represent frequent transactions of a dataset that comprise one or more items,
   transforming the frequent pattern tree to a frequent pattern array that comprises an item array and a plurality of node arrays, the item array comprising frequent transactions of the dataset and each node array to associate an item of the dataset with one or more frequent transactions of the item array, and
   identifying frequent transactions of the dataset based upon the frequent pattern array.

2. The method of claim 1 further comprising:
   eliminating a redundant transaction from the item array, and
   updating the plurality of node arrays to account for the redundant transaction eliminated from the item array.

3. The method of claim 2 further comprising adjusting a size of storage elements of the item array based upon a total number of item labels stored in the item array.

4. The method of claim 3 further comprising:
   prefetching items of a transaction in response to accessing the frequent pattern array.

5. The method of claim 3 further comprising in response to accessing a node array for an item that comprises a first transaction and a second transaction that follows the first transaction in the node array,
   initiating a software prefetch of the second transaction from the item array,
   accessing items of the first transaction from the item array after initiating the software prefetch of the second transaction, and
   accessing items of the second transaction from the item array after accessing the items of the first transaction.

6. The method of claim 1, wherein transforming includes
setting a begin value of each node array element of the plurality of node arrays to an index value of the item array that corresponds to a start of its associated frequent pattern in the item array, and
setting a length value of each node array element to indicate a length of its associated frequent pattern in the item array.

7. The method of claim 6, wherein transforming further includes
setting a count value of each node array element of the plurality of node arrays to indicate frequency of its respective frequent pattern in the dataset.

8. A machine readable medium comprising a plurality of instructions that in response to being executed result in a computing device:
building a frequent pattern tree comprising a plurality of nodes to represent frequent transactions of a dataset that comprise one or more items,
transforming the frequent pattern tree to a frequent pattern array that comprises an item array and a plurality of node arrays, the item array comprising frequent transactions of the dataset and each node array to associate an item of the dataset with one or more frequent transactions of the item array, and
identifying frequent transactions of the dataset based upon the frequent pattern array.

9. The machine readable medium of claim 8, wherein the plurality of instructions, in response to being executed, further result in the computing device
eliminating a redundant transaction from the item array, and
updating the plurality of node arrays to account for the redundant transaction eliminated from the item array.

10. The machine readable medium of claim 9, wherein the plurality of instructions, in response to being executed, further result in the computing device adjusting a size of storage elements of the item array based upon a total number of item labels stored in the item array.

11. The machine readable medium of claim 10, wherein the plurality of instructions, in response to being executed, further result in the computing device prefetching items of a transaction in response to accessing the frequent pattern array.

12. The machine readable medium of claim 10, wherein the plurality of instructions, in response to being executed, further result in the computing device
accessing a node array for an item that comprises a first transaction and a second transaction that follows the first transaction in the node array,
initiating a software prefetch of the second transaction from the item array,
accessing items of the first transaction from the item array after initiating the software prefetch of the second transaction, and
accessing items of the second transaction from the item array after accessing the items of the first transaction.

13. The machine readable medium of claim 8, wherein the plurality of instructions, in response to being executed, further result in the computing device
setting a begin value of each node array element of the plurality of node arrays to an index value of the item array that corresponds to a start of its associated frequent pattern in the item array, and
setting a length value of each node array element to indicate a length of its associated frequent pattern in the item array.

14. The machine readable medium of claim 13, wherein the plurality of instructions, in response to being executed, further result in the computing device setting a count value of each node array element of the plurality of node arrays to indicate frequency of its respective frequent pattern in the dataset.

15. A computing device, comprising:
a processor having a cache, and
a machine readable medium comprising a plurality of instructions that, in response to being executed by the processor, causes the processor
to build a frequent pattern tree comprising a plurality of nodes to represent frequent transactions of a dataset that comprise one or more items,
to generate from the frequent pattern tree an item array to contiguously stores items of frequent transactions to support storage of frequent transactions in the cache of the processor, and
to generate from the frequent pattern tree a plurality of node arrays, each node array to associate an item of the dataset with one or more frequent transactions of the item array.

16. The computing device of claim 15, wherein the plurality of instructions further cause the processor to eliminate a redundant transaction from the item array, and to update the plurality of node arrays to account for the redundant transaction eliminated from the item array.

17. The computing device of claim 16, wherein the plurality of instructions further cause the processor to adjust a size of storage elements of the item array based upon a total number of item labels stored in the item array.

18. The computing device of claim 15, wherein the processor further includes a prefetcher to prefetch items of a transaction in response to accessing a frequent transaction of the item array.

19. The computing device of claim 18, wherein the plurality of instructions further cause the processor to initiate a software prefetch of a transaction from the item array.

20. The computing device of claim 18, wherein the plurality of instructions further cause the processor to set a begin value of each node array element of the plurality of node arrays to an index value of the item array that corresponds to a start of its associated frequent pattern in the item array, to set a length value of each node array element to indicate a length of its associated frequent pattern in the item array, and to set a count value of each node array element of the plurality of node arrays to indicate frequency of its respective frequent pattern in the dataset.

* * * * *